ALFRED RAYMOND & ALBERT RAYMOND.
PROCESS OF MANUFACTURING MULTIPLE CHAMBER INNER TUBES FOR PNEUMATIC TIRES.
APPLICATION FILED SEPT. 25, 1913.
1,079,186.
Patented Nov. 18, 1913.
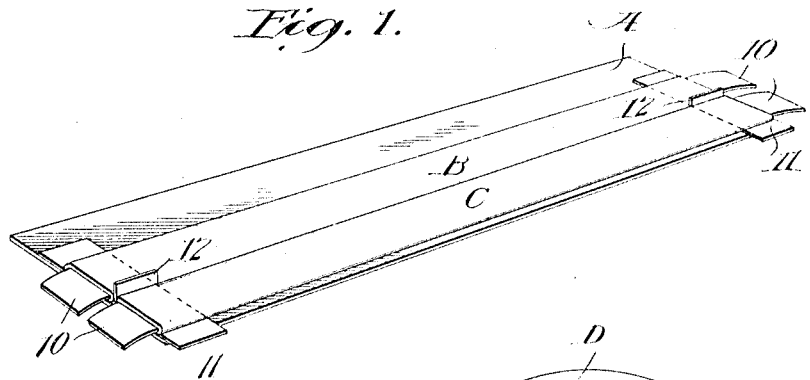
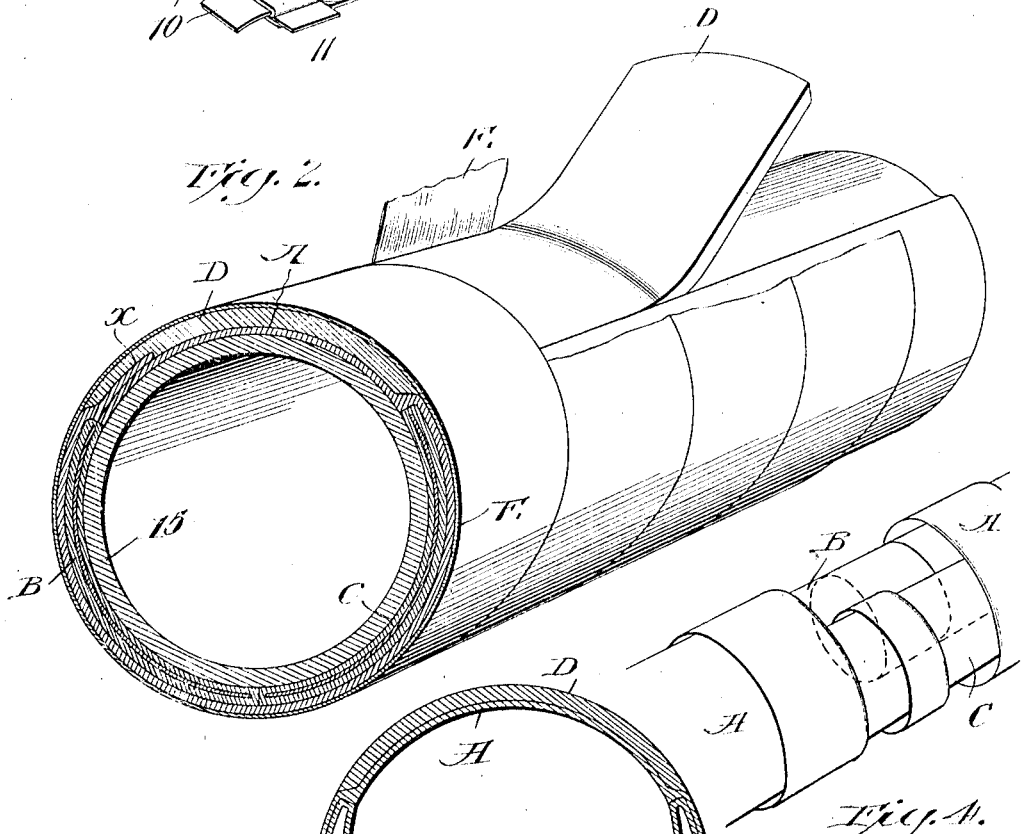
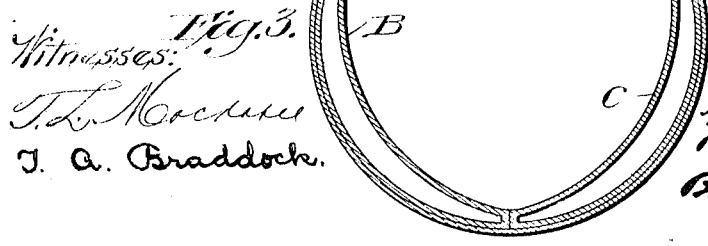

UNITED STATES PATENT OFFICE.

ALFRED RAYMOND AND ALBERT RAYMOND, OF WASHINGTON, DISTRICT OF COLUMBIA.

PROCESS OF MANUFACTURING MULTIPLE-CHAMBER INNER TUBES FOR PNEUMATIC TIRES.

1,079,186.        Specification of Letters Patent.        Patented Nov. 18, 1913.

Application filed September 25, 1913. Serial No. 791,830.

*To all whom it may concern:*

Be it known that we, ALFRED RAYMOND and ALBERT RAYMOND, citizens of the United States, residing at Washington, District of Columbia, have invented and discovered certain new and useful Improvements in Processes of Manufacturing Multiple-Chamber Inner Tubes for Pneumatic Tires, of which the following is a specification.

Our said invention consists in an improved process for manufacturing multiple chamber inner tube structures for pneumatic tires whereby such a structure may be formed at one operation upon a single mandrel and in a comparatively inexpensive manner, all as will be hereinafter more fully described and claimed.

Referring to the accompanying drawing which is made a part hereof and on which similar reference characters indicate similar parts, Figure 1 is a perspective view of the parts of which the inner tube structure is composed as assembled before winding upon the mandrel, Fig. 2 a perspective view of a mandrel having the various parts of which the tire is composed bound thereon in position for "curing", Fig. 3 a cross-section through a finished tube, and Fig. 4 a detail perspective view illustrating the method of splicing the ends of the tube.

Said process is carried out as follows: A sheet, A, of the raw material, as rubber, of the proper length and width to form a tube structure of the desired length and diameter, is laid flat upon a table or bench. Two smaller tubes B and C each of a diameter equal to approximately one third of the circumference of the tube structure as a whole, are placed upon the face of said sheet A edge to edge, as illustrated in Fig. 1. The tubes B and C are also of elastic material, as rubber, flattened, and contain, or are wrapped around, strips of substance adapted to prevent their adjacent faces from fusing or adhering. For this purpose we have used strips 10 of glazed "holland", but other appropriate material, or substance, may, of course, be used instead. Said strips 10 are of a width equal to the normal diameter of tubes B and C. In order to provide for the splicing of the several tubes or chambers when formed, we also insert other strips 11, of like material, between the ends of tubes B and C and the adjacent face of the sheet A and in order to maintain the ends of the tubes B and C independent of each other, a fold or part 12 of such material projects upward between their adjacent edges at each end. Said strips 11 with the parts 12 are of equal width, approximately five or six inches, or whatever length may be necessary to form an approximate splice between the parts. The several parts as shown in Fig. 1 are then placed upon a mandrel 15 of appropriate material and hollow, the edges of the sheet A overlapping as at *x*. A strip D of raw material of a width adapted to fill the space between the outer edges of tubes B and C, is placed upon the outside of the sheet A in appropriate position to fill said space, being of the requisite thickness. The whole is then bound upon said mandrel under pressure by winding tightly a strip E of binding material, such as glazed "holland", or other non-adhesive fabric, around the exterior thereof, which serves to force the strip D into the recess between the edges of tubes B and C forming a substantially even exterior surface, and a tube structure of substantially uniform thickness throughout its circumference. The mandrels thus prepared are then introduced into an oven heated to appropriate temperature, and the rubber, or raw material of other character found appropriate, is heated to a fusing point, under which heat the outer faces of tubes B and C fuse with the inner face of the sheet A and the overlapping edges of said sheet A fuse together and the filling strip D fuses with the outside surface of sheet A, thus forming a complete tube structure of uniform thickness throughout its circumference, and a tube structure wherein a multiplicity of chambers are provided, one by the outside tube A and two others by the tubes B and C, the walls of which are kept from fusing by the strips 10 as before described.

After the tube structure has cured it is stripped from the mandrel, the strips 10, 11, and 12, withdrawn, leaving a tube of appropriate length with the several chambers fused together except for a distance at each end, and said ends free from each other. In the splicing operation the free ends of the tube A are turned back, as shown in Fig. 4, leaving the free ends of tubes B and C projecting beyond the end of tube A. Tubes B and C are then spliced successively and independently, in the manner ordinarily employed for the splicing of single tubes, consisting of turning back one end, spreading the cement upon the other end, bringing the ends together, and then turning forward the turned back end upon the cemented exterior surface of the complementary projecting end, which may be held distended, or expanded, by turning in a moderate air pressure after the ends have been first brought together and continuing the pressure until the splice is complete. This method is illustrated in Fig. 4, wherein one inner tube is shown with the splice complete, the other is ready for splicing, and the free ends of tube A are turned back out of the way, but may be spliced in the same manner after both inner tubes are spliced.

It will be understood, of course, that patches of glazed "holland," or other suitable material, may be placed between the tubes at the point, or points, where valves are to be inserted in order to preserve a suitable space for the connection. It will also be understood that the tubes B and C may be formed before assembling with the sheet A, or may themselves be sheets of appropriate dimensions folded over the strips 10 with their edges overlapping and adapted to fuse when the whole structure is placed in the oven on the mandrel. It will also be understood that the free ends of the tubes B and C left for splicing purposes, may be secured to the inner surface of the tube A by placing cement on the appropriate portion of their surfaces and introducing sufficient air pressure to flatten said portions against said tube A until adhesion results.

In removing the glazed "holland" from within the tubes B and C, I have found it helpful to force water through the tubes, which releases the fabric and permits it to be easily withdrawn by hand.

The method of construction above described will provide an inner tube structure with its rough or wrapped side on the outside face when in use. In order to obtain a smooth exterior, as is in some cases desired, it will be necessary to reverse the process or building upon the mandrel, that is, first wrapping the mandrel with the single sheet of stock, then applying the tubes constructed upon the strips of "holland," adding the thickening strip, and binding the whole upon the mandrel, and after curing turning the structure inside out.

The method above described may be modified in other particulars so far as details are concerned without departing from our said invention.

Having thus fully described our said invention what we claim as new and desire to secure by Letters Patent is:

1. The process of manufacturing multiple chamber rubber tubes which consists in arranging a series of tubes on the surface of a sheet of material from which an outer tube is to be formed, inserting within said inner tubes substance of a character to prevent adhesion of the adjacent surfaces, winding the whole upon a mandrel and subjecting to heat sufficient to fuse the several parts together, substantially as set forth.

2. The process of manufacturing multiple chamber rubber tubes comprising placing a series of small tubes containing cores of non-adhesive material on a sheet of material of dimensions requisite to form the large tube, placing a strip of thickening material between adjacent edges of said smaller tubes, binding the several parts upon the mandrel and subjecting the whole to heat until the several parts fuse together, substantially as set forth.

3. The process of manufacturing multiple chamber inner tubes for pneumatic tires comprising arranging a series of smaller tubes with their inner faces separated by non-adhesive substance and a sheet of material of dimensions requisite to form a large tube upon a mandrel, placing a strip of thickening material in the space between the edges of the smaller tubes, binding the whole to the mandrel, and subjecting it to heat sufficient to fuse the several parts together, substantially as set forth.

4. The process of manufacturing multiple chamber inner tubes for pneumatic tires comprising arranging a series of smaller tubes with their inner faces separated by non-adhesive substance and a sheet of material to form the large tube upon a mandrel, the ends of said sheet and the ends of said tubes being also separated by a non-adhesive substance, binding the whole to a mandrel, fusing the parts together, and then splicing the ends of the separate tubes, substantially as set forth.

In witness whereof, we have hereunto set our hands and seals at Akron, Ohio, this 24th day of September, A. D., nineteen hundred and thirteen.

ALFRED RAYMOND. [L. S.]
ALBERT RAYMOND. [L. S.]

Witnesses:
HELEN L. GAULT,
CARRIE D. KNECHT.